US010573232B2

(12) United States Patent
Song et al.

(10) Patent No.: US 10,573,232 B2
(45) Date of Patent: Feb. 25, 2020

(54) CONVERSION CIRCUIT AND OPERATION METHOD THEREOF, COMPENSATION DEVICE, AND DISPLAY APPARATUS

(71) Applicant: BOE TECHNOLOGY GROUP CO., LTD., Beijing (CN)

(72) Inventors: Chen Song, Beijing (CN); Zhongyuan Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,500

(22) PCT Filed: May 5, 2017

(86) PCT No.: PCT/CN2017/083201

§ 371 (c)(1),
(2) Date: Oct. 10, 2017

(87) PCT Pub. No.: WO2018/014628

PCT Pub. Date: Jan. 25, 2018

(65) Prior Publication Data

US 2018/0308423 A1 Oct. 25, 2018

(30) Foreign Application Priority Data

Jul. 19, 2016 (CN) .......................... 2016 1 0575644

(51) Int. Cl.
*G06F 3/038* (2013.01)
*G09G 3/3233* (2016.01)
(Continued)

(52) U.S. Cl.
CPC ......... *G09G 3/3233* (2013.01); *G09G 3/3283* (2013.01); *G09G 2310/0272* (2013.01);
(Continued)

(58) Field of Classification Search
None
See application file for complete search history.

(56) References Cited

U.S. PATENT DOCUMENTS 7,415,256 B2 8/2008 Nakano
7,622,906 B2 11/2009 Kushima et al.
(Continued)

FOREIGN PATENT DOCUMENTS

CN 1747367 A 3/2006
CN 101169671 A 4/2008
(Continued)

OTHER PUBLICATIONS

Third Office Action dated Feb. 3, 2019, for corresponding application CN 201610575644.2 with English translation.
(Continued)

*Primary Examiner* — Priyank J Shah
*Assistant Examiner* — Kirk W Hermann
(74) *Attorney, Agent, or Firm* — Nath, Goldberg & Meyer; Joshua B. Goldberg; Stephanie Majkut

(57) ABSTRACT

The present disclosure provides conversion circuit and operation method thereof, compensation device, and display apparatus. The conversion circuit includes a conversion unit connected between an output terminal and a first voltage terminal, and an input unit connected with an input terminal and the conversion unit respectively; the input unit is configured to receive current signal from the input terminal and supply the current signal to the conversion unit, and the conversion unit is configured to convert the current signal supplied by the input unit into voltage signal and output the voltage signal from the output terminal; and an equivalent resistance of the conversion unit is configured such that preset voltage corresponding to standard current is output from the output terminal when the standard current is input
(Continued)

from the input terminal. With the technical solutions of the present disclosure, drive current for pixel can be accurately converted into voltage signal.

18 Claims, 5 Drawing Sheets

(51) Int. Cl.
*G09G 3/3283* (2016.01)
*G09G 5/00* (2006.01)

(52) U.S. Cl.
CPC ............... *G09G 2310/0289* (2013.01); *G09G 2320/0223* (2013.01); *G09G 2320/0233* (2013.01)

(56) References Cited

U.S. PATENT DOCUMENTS

| | | | | | |
|---|---|---|---|---|---|
| 7,904,121 | B2 | 3/2011 | Umeda et al. | | |
| 2003/0151617 | A1* | 8/2003 | Morita | G09G 3/2011 | 345/690 |
| 2004/0227499 | A1* | 11/2004 | Date | G09G 3/3241 | 323/315 |
| 2006/0097759 | A1* | 5/2006 | Omori | G09G 3/3208 | 327/108 |
| 2007/0159418 | A1* | 7/2007 | Mizuki | G09G 3/2011 | 345/76 |
| 2008/0084240 | A1* | 4/2008 | Passerini | G05F 3/30 | 327/539 |
| 2008/0100491 | A1* | 5/2008 | Umeda | G06K 19/0701 | 341/176 |
| 2008/0180070 | A1* | 7/2008 | Kushima | G05F 3/30 | 323/233 |
| 2010/0013869 | A1* | 1/2010 | Matsumoto | G09G 3/2011 | 345/690 |
| 2014/0070777 | A1* | 3/2014 | Wu | G05F 3/30 | 323/271 |
| 2016/0379553 | A1* | 12/2016 | Cho | G09G 3/3233 | 345/76 |
| 2017/0162120 | A1* | 6/2017 | Hung | G09G 3/3233 | |

FOREIGN PATENT DOCUMENTS

| | | | |
|---|---|---|---|
| CN | 101169834 | A | 4/2008 |
| CN | 102332893 | A | 1/2012 |
| CN | 102543337 | A | 7/2012 |
| CN | 106251809 | A | 12/2016 |
| JP | 2005-121367 | A | 5/2005 |

OTHER PUBLICATIONS

Office Action dated Mar. 5, 2018 issued in corresponding Chinese Application No. 201610575644.2.

International Search Report dated Jul. 27, 2017 in corresponding International Application No. PCT/CN2017/083201 along with an English translation of the International Search Report and an English translation of the Written Opinion of the International Searching Authority.

* cited by examiner

CONVERSION CIRCUIT AND OPERATION METHOD THEREOF, COMPENSATION DEVICE, AND DISPLAY APPARATUS

This is a National Phase Application filed under 35 U.S.C. 371 as a national stage of PCT/CN2017/083201, filed May 5, 2017, an application claiming the benefit of Chinese Application No. 201610575644.2, filed Jul. 19, 2016, the content of each of which is hereby incorporated by reference in its entirety.

FIELD

The present disclosure relates to the field of display technologies, and particularly, to a conversion circuit, an operation method of the conversion circuit, a compensation device, and a display apparatus.

BACKGROUND

In an existing pixel circuit, a drive TFT (Thin Film Transistor) is turned on by a data voltage to generate a drive current acting on an OLED (Organic Light-Emitting Diode), thereby driving the OLED to emit light. Due to uncontrollable factors in processes and uncontrollable factors in practical manufacture, characteristics of drive TFTs are not all the same, and may even be quite different. As such, drive currents generated by drive TFTs under a same data voltage may not be the same, and may even be quite different, such that brightness of OLEDs is not uniform.

In the prior art, in order to address this problem, the data voltage is compensated, so that the drive current generated by the drive TFT can have a desired value. In the process of the compensation, a current signal needs to be converted into a voltage signal. However, effect of the compensation is affected by loss of conversion accuracy.

SUMMARY

The present disclosure provides a conversion circuit, an operation method of the conversion circuit, a compensation device, and a display apparatus, which can at least partially address the problem of affected effect of the compensation due to loss of conversion accuracy occurring in conversion from a current signal to a voltage signal in the compensating process for pixel.

In an aspect, the present disclosure provides a conversion circuit including a conversion unit connected between an output terminal and a first voltage terminal, and an input unit connected with an input terminal and the conversion unit, respectively; the input unit is configured to receive a current signal from the input terminal and supply the current signal to the conversion unit, and the conversion unit is configured to convert the current signal supplied by the input unit into a voltage signal and output the voltage signal from the output terminal; and an equivalent resistance of the conversion unit is configured such that a preset voltage corresponding to a standard current is output from the output terminal when the standard current is input from the input terminal.

Optionally, the conversion unit includes a plurality of divider resistors connected in series, each of which is connected in parallel with a switch element, and the equivalent resistance of the conversion unit is adjusted by controlling the switch elements corresponding to the plurality of divider resistors, such that the preset voltage corresponding to the standard current is output from the output terminal when the standard current is input from the input terminal.

Optionally, the input unit is a mirror current source.

Optionally, the input unit includes a first transistor, a second transistor, a third transistor, and a fourth transistor;

a gate electrode of the first transistor is connected with the input terminal, a first electrode of the first transistor is connected with the input terminal, and a second electrode of the first transistor is connected with a second electrode of the second transistor;

a gate electrode of the second transistor is connected with the input terminal, a first electrode of the second transistor is connected with a second electrode of the third transistor, and the second electrode of the second transistor is grounded;

a gate electrode of the third transistor is connected with the first electrode of the second transistor, and a first electrode of the third transistor is connected with a first electrode of the fourth transistor; and a gate electrode of the fourth transistor is connected with the first electrode of the second transistor, and a second electrode of the fourth transistor is connected with the conversion unit.

Optionally, each of the first and second transistors is an n-type MOS transistor, and each of the third and fourth transistors is a p-type MOS transistor.

Optionally, the first voltage terminal is grounded.

Optionally, the input unit includes a fifth transistor and a sixth transistor:

a gate electrode of the fifth transistor is connected with the input terminal, a first electrode of the fifth transistor is connected with the input terminal, and a second electrode of the fifth transistor is connected with a second electrode of the sixth transistor; and a gate electrode of the sixth transistor is connected with the input terminal, a first electrode of the sixth transistor is connected with the conversion unit, and the second electrode of the sixth transistor is grounded.

Optionally, each of the fifth and sixth transistors is an n-type MOS transistor.

Optionally, the first voltage terminal is connected with a high level input terminal.

In another aspect, the present disclosure further provides a compensation device including a compensation unit and any one of the above conversion circuits, an input terminal of the compensation unit being connected with the output terminal of the conversion circuit, and the compensation unit being configured to perform a compensation operation based on the voltage signal output from the conversion circuit.

In another aspect, the present disclosure further provides a display apparatus including a pixel unit and the compensation device described above, a drive current output terminal of the pixel unit being connected with the input terminal of the conversion circuit, the conversion circuit being configured to receive a drive current output from the pixel unit and output a voltage signal corresponding to the drive current, and the compensation unit being configured to perform a compensation operation on a data voltage supplied to the pixel unit based on the voltage signal output from the conversion circuit.

In another aspect, the present disclosure further provides an operation method of a conversion circuit, the conversion circuit including a conversion unit connected between an output terminal and a first voltage terminal, and an input unit connected with an input terminal and the conversion unit, respectively; wherein the operation method of the conversion circuit includes:

inputting a standard current from the input terminal, supplying, by the input unit, the standard current to the conversion unit, and adjusting an equivalent resistance of the conversion unit such that a preset voltage corresponding to the standard current is output from the output terminal; and inputting a drive current from the input terminal, supplying, by the input unit, the drive current to the conversion unit, converting, by the conversion unit, the drive current supplied by the input unit into a voltage signal, and outputting, by the conversion unit, the voltage signal from the output terminal.

The present disclosure has beneficial effects as follow.

The present disclosure provides a conversion circuit, an operation method of the conversion circuit, a compensation device, and a display apparatus. The conversion circuit includes a conversion unit connected between an output terminal and a first voltage terminal, and an input unit connected with an input terminal and the conversion unit respectively; the input unit is configured to receive a current signal from the input terminal and supply the current signal to the conversion unit, and the conversion unit is configured to convert the current signal supplied from the input unit into a voltage signal and output the voltage signal from the output terminal; and an equivalent resistance of the conversion unit is configured such that a preset voltage corresponding to a standard current is output from the output terminal when the standard current is input from the input terminal. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal. Moreover, in the technical solutions of the present disclosure, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

DETAILED DESCRIPTION

To make those skilled in the art better understand technical solutions of the present disclosure, a conversion circuit and an operation method thereof, a compensation device, and a display apparatus provided in the present disclosure will be described in detail below in conjunction with the accompanying drawings.

Figure 1:
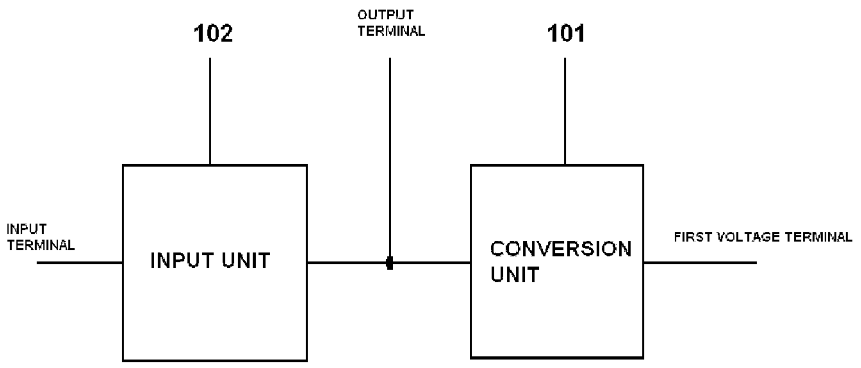
FIG. 1 is a schematic diagram illustrating a structure of a conversion circuit according to an embodiment of the present disclosure.

Embodiments of the present disclosure provide a conversion circuit. FIG. 1 is a schematic diagram illustrating a structure of a conversion circuit according to an embodiment of the present disclosure. As shown in FIG. 1, the conversion circuit includes a conversion unit 101 connected between an output terminal and a first voltage terminal, and an input unit 102 connected with an input terminal and the conversion unit 101 respectively. The input unit 102 is configured to receive a current signal from the input terminal and supply the current signal to the conversion unit 101, and the conversion unit 101 is configured to convert the current signal supplied by the input unit 102 into a voltage signal and output the voltage signal from the output terminal; and an equivalent resistance of the conversion unit 101 is configured such that a preset voltage corresponding to a standard current is output from the output terminal when the standard current is input from the input terminal. According to the technical solution of the present embodiment, the equivalent resistance of the conversion unit is configured such that a preset voltage corresponding to a standard current is output from the output terminal when the standard current is input from the input terminal. As such, when the conversion circuit is used to convert drive currents of different drive TFTs in practical applications, every drive current can be accurately converted into a voltage signal, accuracy of voltage value of which can reflect accuracy of current value of the drive current, such that the drive current can be accurately extracted and converted into the voltage signal.

In an embodiment of the present disclosure, the input unit may be a mirror current source.

Figure 2:
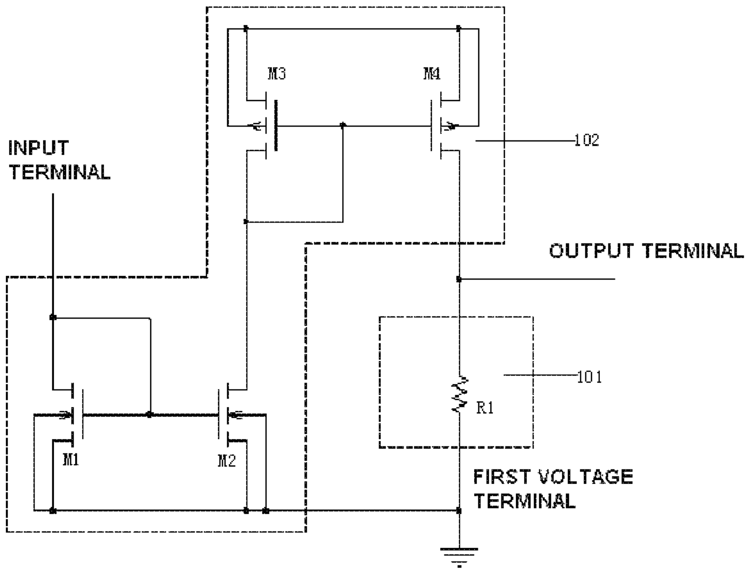
FIG. 2 is a schematic diagram illustrating a specific structure of the conversion circuit in FIG. 1.

FIG. 2 is a schematic diagram illustrating a specific structure of the conversion circuit in FIG. 1. As shown in FIG. 2, the input unit 102 includes a first transistor M1, a second transistor M2, a third transistor M3, and a fourth transistor M4. A gate electrode of the first transistor M1 is connected with the input terminal, a first electrode of the first transistor M1 is connected with the input terminal, and a second electrode of the first transistor M1 is connected with a second electrode of the second transistor M2. A gate electrode of the second transistor M2 is connected with the input terminal, a first electrode of the second transistor M2 is connected with a second electrode of the third transistor M3, and the second electrode of the second transistor M2 is grounded. A gate electrode of the third transistor M3 is connected with the first electrode of the second transistor M2, and a first electrode of the third transistor M3 is connected with a first electrode of the fourth transistor M4. A gate electrode of the fourth transistor M4 is connected with the first electrode of the second transistor M2, and a second electrode of the fourth transistor M4 is connected with the output terminal. Optionally, each of the first and second transistors is an n-type MOS transistor, each of the third and fourth transistors is a p-type MOS transistor, and the first voltage terminal is grounded.

Referring to FIG. 2, a resistor R1 indicates the equivalent resistance of the conversion unit 101. Specifically, a standard current is input from the input terminal, and a voltage value at the output terminal is measured at this time. A value of the resistor R1 is continuously adjusted based on the measured voltage value and a preset voltage value until the measured voltage value reaches the preset voltage value. For example, assuming that the value of the resistor R1 is designed to be 1000K ohm, and the standard current is 1 μA, in this case, the voltage value (a preset voltage value) at the output terminal should be 1V. If a measured voltage value at the output terminal is 1.2V when a standard current of 1 μA is input from the input terminal, it is indicated that an actual value of the resistor R1 is 1200K ohm or so (taking matching error of the input unit 102 into consideration). In this case, the value of the resistor R1 may be reduced, and the voltage value at the output terminal may be measured again and be compared with the preset voltage value (i.e., 1V). After that, the value of the resistor R1 may be further adjusted based on a result of the comparison. Thus, the value of the resistor R1 is continuously adjusted in above manner until the measured voltage value is 1V.

Figure 3:
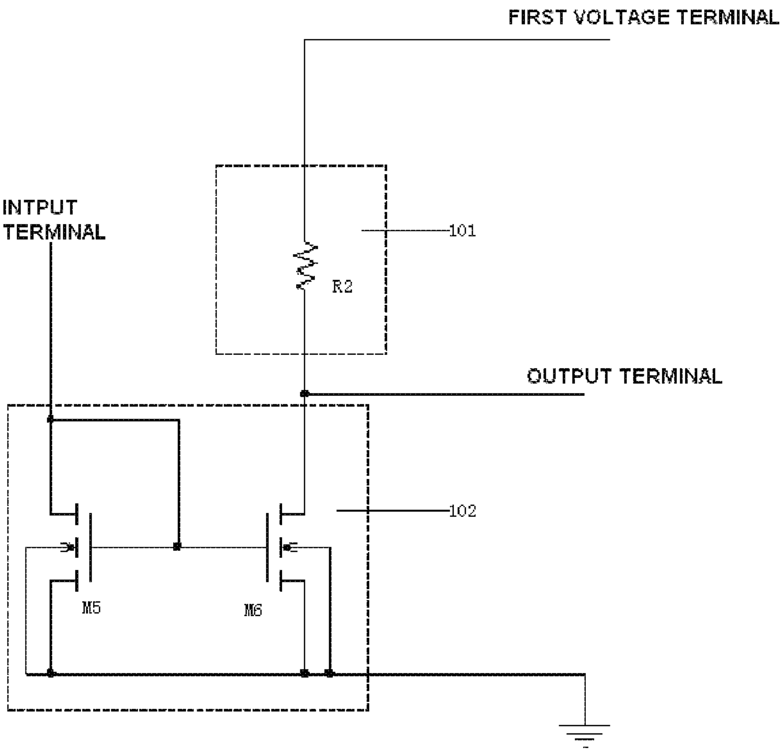
FIG. 3 is a schematic diagram illustrating another specific structure of the conversion circuit in FIG. 1.

FIG. 3 is a schematic diagram illustrating another specific structure of the conversion circuit in FIG. 1. As shown in FIG. 3, the input unit 102 includes a fifth transistor M5 and a sixth transistor M6. A gate electrode of the fifth transistor M5 is connected with the input terminal, a first electrode of the fifth transistor M5 is connected with the input terminal, and a second electrode of the fifth transistor M5 is connected with a second electrode of the sixth transistor M6. A gate electrode of the sixth transistor M6 is connected with the input terminal, a first electrode of the sixth transistor M6 is connected with the output terminal, and the second electrode of the sixth transistor is grounded. Optionally, each of the fifth and sixth transistors is an n-type MOS transistor, and the first voltage terminal is connected with a high level VDD.

Referring to FIG. 3, a resistor R2 indicates the equivalent resistance of the conversion unit 101. Specifically, the first voltage terminal is connected with a high level input terminal, from which a standard high level signal is input. A standard current is input from the input terminal, and a voltage value at the output terminal is measured at this time. A value of the resistor R2 is continuously adjusted based on the measured voltage value and a preset voltage value until the measured voltage value reaches the preset voltage value. For example, assuming that the high level VDD is 3V, a value of the resistor R2 is designed to be 1000K ohm, and the standard current is 1 μA, in this case, the voltage value (a preset voltage value) at the output terminal should be 2V If a measured voltage value at the output terminal is 2.1V, it is indicated that an actual value of the resistor R2 is 900K ohm or so (taking matching error of the input unit 102 into consideration). In this case, the value of the resistor R1 may be increased, and the voltage value at the output terminal may be measured again and be compared with the preset voltage value (i.e., 2V). After that, the value of the resistor R2 may be further adjusted based on a result of the comparison. Thus, the value of the resistor R2 is continuously adjusted in above manner until the measured voltage value is 2V.

Figure 4:
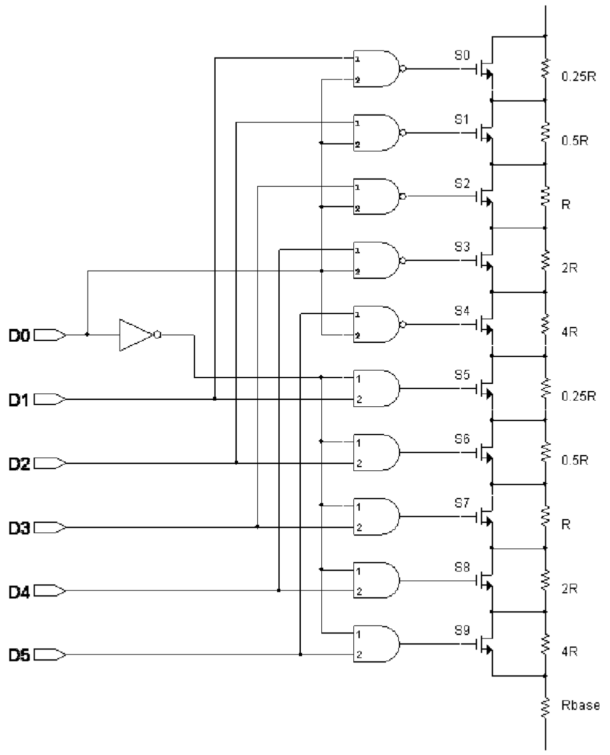
FIG. 4 is a schematic diagram illustrating a specific structure of a conversion unit in FIG. 1.

FIG. 4 is a schematic diagram illustrating a specific structure of a conversion unit in FIG. 1. As shown in FIG. 4, in addition to other elements, the conversion unit includes a plurality of divider resistors and a plurality of switch elements (i.e., transistors S1, S1, S2, . . . , S9), each of the plurality of divider resistors is connected in parallel with one switch element, and the equivalent resistance of the conversion unit is adjusted by controlling states of the switch elements. The conversion unit shown in FIG. 4 includes six input terminals D0 to D5, and data input from the input terminals D0 to D5 are used for controlling the states of the transistors S0 to S9 to thus adjust the equivalent resistance of the entire conversion unit. Specifically, the input terminal D0 serves as a sign bit, input terminals D1 to D5 serve as data bits, the input terminals D0 to D5 may be set as 0 by default, and in this case, the transistors S0 to S4 are turned on while the transistors S5 to S9 are turned off. At this time, a resistor Rbase and resistors corresponding to the transistors S5 to S9 are connected into a series of resistors, thereby forming an equivalent resistor having a resistance value of 1000K ohm. When the resistance value is required to be increased, the input terminal D0 is set as 1, and a corresponding data bit is selected and set as 1 among the input terminals D1 to D5. When the resistance value is required to be decreased, the input terminal D0 is maintained as 0, and a corresponding data bit is selected and set as 1 among the input terminals D1 to D5. If R is set to be 20K ohm, then the variable range of the resistance value of the formed equivalent resistor is from 845K ohm to 1155K ohm, and the minimum accuracy is 5K ohm, namely, 0.5%; if R is set to be 10K ohm, then the variable range of the resistance value of the formed equivalent resistor is from 922.5K ohm to 1077.5K ohm, and the minimum accuracy is 2.5K ohm, namely, 0.25%; if R is set to be 2K ohm, then the variable range of the resistance value of the formed equivalent resistor is from 984.5K ohm to 1015.5K ohm, and the minimum accuracy is 0.5K ohm, namely, 0.05%. Those skilled in the art should be understood that the value of R is not limited to these values, and the value of R can be selected as practically required. In the present embodiment, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

In the present embodiment, other logic elements, transistors and resistors may be added, if the variable range of the resistance value of the equivalent resistor of the conversion unit needs to be extended. For example, data bits D6 and D7 and corresponding resistors may be added, the resistance values of the corresponding resistors may be 8R and 16R, and if R is set to be 2K ohm, the variable range of the resistance value of the equivalent resistor of the conversion unit 101 is from 936.5K ohm to 1063.5K ohm, namely, a drift within ±6.35% of internal resistance of a chip can be covered. Needless to say, the variable range of the resistance value of the equivalent resistor of the conversion unit may be further extended. For example, data bits D6, D7, D8, D9 and D10 and corresponding resistors may be added, the resistance values of the corresponding resistors may be 8R, 16R, 32R, 64R and 128R, and if R is set to be 2K ohm, the variable range of the resistance value of the equivalent resistor of the conversion unit 101 is from 488.5K ohm to 1511.5K ohm namely, a drift within ±51.15% of internal resistance of a chip can be covered, and accuracy is 0.05%.

In the present embodiment, the current signal input from the input terminal can be supplied to the conversion unit through the mirror current source, such that a problem occurred when a resistor in the conversion unit is connected in parallel with an OLED can be avoided.

The conversion circuit in the present embodiment includes a conversion unit connected between an output terminal and a first voltage terminal, and an input unit connected with an input terminal and the conversion unit respectively; the input unit is configured to receive a current signal from the input terminal and supply the current signal to the conversion unit, and the conversion unit is configured to convert the current signal supplied by the input unit into a voltage signal and output the voltage signal from the output terminal; and an equivalent resistance of the conversion unit is configured such that a preset voltage corresponding to a standard current is output from the output terminal when the standard current is input from the input terminal. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal. Moreover, in the technical solution of the present embodiment, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

Figure 5:
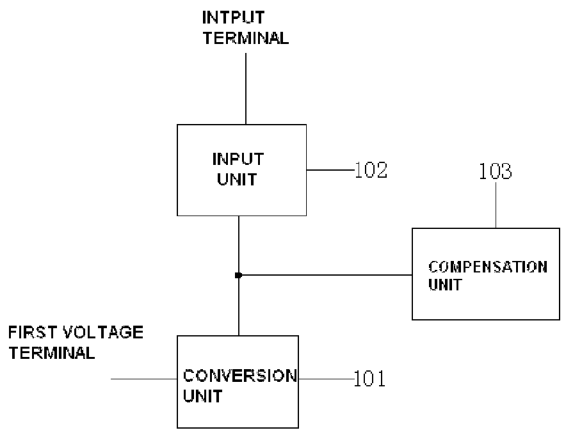
FIG. 5 is a schematic diagram illustrating a structure of a compensation device according to an embodiment of the present disclosure.

Embodiments of the present disclosure also provide a compensation device. FIG. 5 is a schematic diagram illustrating a structure of a compensation device according to an embodiment of the present disclosure. As shown in FIG. 5, the compensation device includes a compensation unit 103 and the conversion circuit according to the above embodiments. The conversion circuit includes the conversion unit 101 and the input unit 102. The conversion unit 101 is connected between the output terminal of the conversion circuit and the first voltage terminal, the input unit 102 is respectively connected with the input terminal of the conversion circuit and the conversion unit 101, and an input terminal of the compensation unit 103 is connected with the output terminal of the conversion circuit. The compensation unit is configured to perform a compensation operation based on the voltage signal output from the conversion circuit. Detail description with respect to the conversion circuit may refer to the description in the above embodiments, and will not be repeated here.

In the compensation device provided in the present embodiment, the conversion unit is connected between the output terminal and the first voltage terminal, and the input unit is respectively connected with the input terminal and the conversion unit; the input unit is configured to receive a current signal from the input terminal and supply the current signal to the conversion unit, and the conversion unit is configured to convert the current signal supplied by the input unit into a voltage signal and output the voltage signal from the output terminal; and an equivalent resistance of the conversion unit is configured such that a preset voltage corresponding to a standard current is output from the output terminal when the standard current is input from the input terminal. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal. Moreover, in the technical solution of the present embodiment, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

Figure 6:
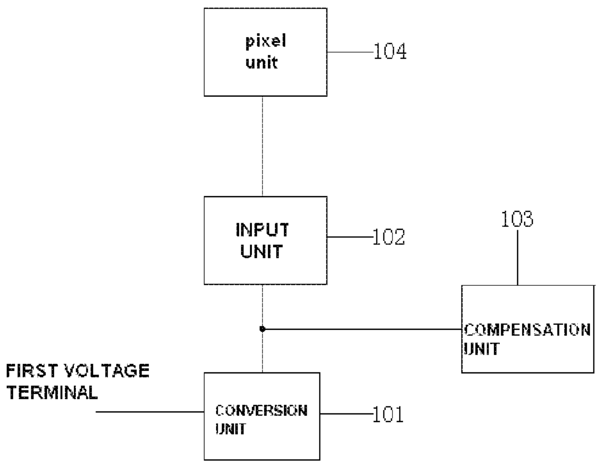
FIG. 6 is a schematic diagram illustrating a structure of a display apparatus according to an embodiment of the present disclosure.

Embodiments of the present disclosure also provide a display apparatus. FIG. 6 is a schematic diagram illustrating a structure of a display apparatus according to an embodiment of the present disclosure. As shown in FIG. 6, the display apparatus includes a pixel unit 104 and the compensation device according to the above embodiment. The compensation device includes the compensation unit 103, the conversion unit 101 and the input unit 102. The conversion unit 101 is connected with the output terminal of the conversion circuit and the first voltage terminal, respectively. The input unit 102 is connected with the input terminal of the conversion circuit and the compensation unit 103, respectively. The pixel unit 104 is connected with the input unit 102 through the input terminal of the conversion circuit. The input terminal of the compensation unit 103 is connected with the output terminal of the conversion circuit. The conversion circuit is configured to receive a drive current output from the pixel unit and output a voltage signal corresponding to the drive current. The compensation unit is configured to perform a compensation operation on a data voltage supplied to the pixel unit based on the voltage signal output from the conversion circuit. Detail description with respect to the compensation device may refer to the description in the above embodiment, and will not be repeated here In the display apparatus provided in the present embodiment, the conversion circuit includes the conversion unit and the input unit; the conversion unit is connected between the output terminal and the first voltage terminal, and the input unit is respectively connected with the input terminal and the conversion unit; the input unit is configured to receive a current signal from the input terminal and supply the current signal to the conversion unit, and the conversion unit is configured to convert the current signal supplied by the input unit into a voltage signal and output the voltage signal from the output terminal; and an equivalent resistance of the conversion unit is configured such that a preset voltage corresponding to a standard current is output from the output terminal when the standard current is input from the input terminal. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal. Moreover, in the technical solution of the present embodiment, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

Figure 7:
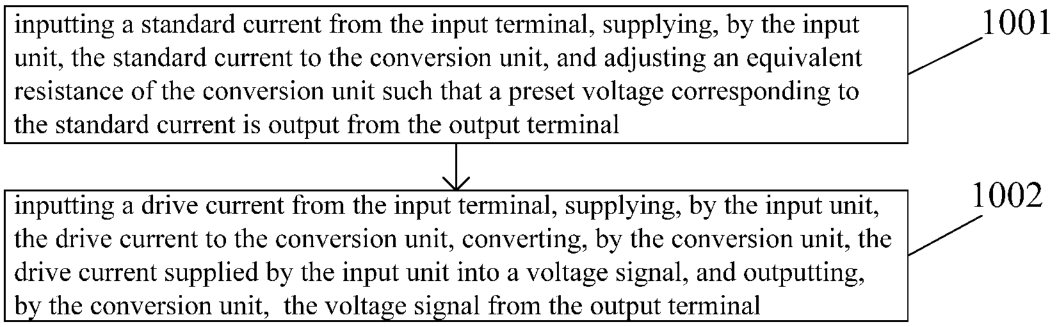
FIG. 7 is a flowchart illustrating an operation method of a conversion circuit according to an embodiment of the present disclosure.

Embodiments of the present disclosure also provide an operation method of a conversion circuit. FIG. 7 is a flowchart illustrating an operation method of a conversion circuit according to an embodiment of the present disclosure. The conversion circuit includes a conversion unit connected between an output terminal and a first voltage terminal, and an input unit connected with an input terminal and the conversion unit respectively. The operation method of the conversion circuit includes steps 1001 and 1002.

Step 1001 includes: inputting a standard current from the input terminal, supplying, by the input unit, the standard current to the conversion unit, and adjusting an equivalent resistance of the conversion unit such that a preset voltage corresponding to the standard current is output from the output terminal.

Step 1002 includes: inputting a drive current from the input terminal, supplying, by the input unit, the drive current to the conversion unit, converting, by the conversion unit, the drive current supplied by the input unit into a voltage signal, and outputting, by the conversion unit, the voltage signal from the output terminal.

In the present embodiment, by adjusting the equivalent resistance of the conversion unit, a preset voltage corresponding to a standard current is output from the output terminal when the standard current is input from the input terminal. Specifically, a standard current is input from the input terminal, a voltage value at the output terminal is measured at this time, and an equivalent resistance of the conversion unit is continuously adjusted based on the measured voltage value and a preset voltage value until the measured voltage value reaches the preset voltage value. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal.

In the operation method of the conversion circuit according to the present embodiment, the equivalent resistance of the conversion unit is adjusted such that a preset voltage corresponding to a standard current is output from the output terminal when the standard current is input from the input terminal. As such, when the conversion circuit is used for converting drive currents of different drive TFTs in practical applications, every drive current can be accurately converted into a voltage signal, accuracy of voltage value of which can reflect accuracy of current value of the drive current, such that the drive current can be accurately extracted and converted into the voltage signal. Moreover, in the technical solution of the present disclosure, by adjusting the equivalent resistance of the conversion unit, the drive current for pixel is accurately converted into the voltage signal, and in turn loss of conversion accuracy due to difference between individual devices such as resistors can be avoided. Furthermore, the voltage signal can be directly applied to the compensation circuit in subsequent stage to compensate the data voltage for the pixel unit, such that drive TFTs driven by different data voltages can generate an identical drive current, thereby achieving uniform display brightness.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

What is claimed is:

1. A conversion circuit, comprising a conversion unit connected between an output terminal and a first voltage terminal, and an input unit connected with an input terminal and the conversion unit, respectively, wherein the input unit is configured to receive a current signal from the input terminal and supply the current signal to the conversion unit, the conversion unit is configured to convert the current signal supplied by the input unit into a voltage signal and output the voltage signal from the output terminal, and an equivalent resistance of the conversion unit is configured such that the voltage signal having a preset value corresponding to a standard current is output from the output terminal when the standard current is input from the input terminal, wherein the conversion unit comprises a plurality of divider resistors connected in series, each of the plurality of divider resistors is connected in parallel with a corresponding one of a plurality of switch elements, and the equivalent resistance of the conversion unit is adjusted by controlling the switch elements corresponding to the plurality of divider resistors, such that a preset voltage corresponding to the standard current is output from the output terminal when the standard current is input from the input terminal, wherein the plurality of divider resistors comprises a plurality of divider resistor groups, each of the plurality of divider resistor groups comprises a same number of divider resistors, wherein in each of the plurality of divider resistor groups, one of two adjacent divider resistors has a resistance different from a resistance of another one of the two adjacent divider resistors, wherein the conversion unit further comprises one first input terminal, one inverter, a plurality of second input terminals, a plurality of logic elements and one resistor, the one resistor being connected in series with the plurality of divider resistors, wherein the one first input terminal is electrically connected with the plurality of logic elements, respectively, and configured to receive a first control signal, output the first control signal to a plurality of first logic elements of the plurality of logic elements, and output an inverted first control signal to a plurality of second logic elements of the plurality of logic elements through the inverter, each of the plurality of second logic elements being different from each of the plurality of first logic elements, each of the plurality of second input terminals is connected with a corresponding one of the plurality of first logic elements and a corresponding one of the plurality of second logic elements, and configured to receive a second control signal and output the second control signal to the corresponding one of the plurality of first logic elements and the corresponding one of the plurality of second logic elements, respectively, and each of the plurality of logic elements is connected with a corresponding one of the plurality of switch elements, and configured to control, based on the second control signal and one of the first control signal and the inverted first control signal, the corresponding one of the plurality of switch elements to adjust the equivalent resistance of the conversion unit.

2. The conversion circuit of claim 1, wherein the input unit is a mirror current source.

3. The conversion circuit of claim 2, wherein the input unit comprises a first transistor, a second transistor, a third transistor, and a fourth transistor;

a gate electrode of the first transistor is directly connected with the input terminal, a first electrode of the first transistor is directly connected with the input terminal, and a second electrode of the first transistor is directly connected with a second electrode of the second transistor;

a gate electrode of the second transistor is directly connected with the input terminal, a first electrode of the second transistor is directly connected with a second electrode of the third transistor, and the second electrode of the second transistor is directly connected with a ground terminal;

a gate electrode of the third transistor is directly connected with the first electrode of the second transistor, and a first electrode of the third transistor is directly connected with a first electrode of the fourth transistor; and a gate electrode of the fourth transistor is directly connected with the first electrode of the second transistor, and a second electrode of the fourth transistor is directly connected with the conversion unit, and wherein the input terminal is different from the ground terminal.

4. The conversion circuit of claim 3, wherein each of the first and second transistors is an n-type MOS transistor, and each of the third and fourth transistors is a p-type MOS transistor.

5. The conversion circuit of claim 3, wherein the first voltage terminal is grounded.

6. The conversion circuit of claim 2, wherein the input unit comprises a fifth transistor and a sixth transistor;

a gate electrode of the fifth transistor is directly connected with the input terminal, a first electrode of the fifth transistor is directly connected with the input terminal, and a second electrode of the fifth transistor is directly connected with a second electrode of the sixth transistor; and a gate electrode of the sixth transistor is directly connected with the input terminal, a first electrode of the sixth transistor is directly connected with the conversion unit, and the second electrode of the sixth transistor is directly connected with a ground terminal, and wherein the input terminal is different from the ground terminal.

7. The conversion circuit of claim 6, wherein each of the fifth and sixth transistors is an n-type MOS transistor.

8. The conversion circuit of claim 6, wherein the first voltage terminal is connected with a high level input terminal.

9. A compensation device, comprising a compensation unit and the conversion circuit of claim 1, wherein an input terminal of the compensation unit is connected with the output terminal of the conversion circuit, and the compensation unit is configured to perform a compensation operation based on the voltage signal output from the conversion circuit.

10. A display apparatus, comprising a pixel unit and the compensation device of claim 9, wherein a drive current output terminal of the pixel unit is connected with the input terminal of the conversion circuit, the conversion circuit is configured to receive a drive current output from the pixel unit and output a voltage signal corresponding to the drive current, and the compensation unit is configured to perform the compensation operation on a data voltage supplied to the pixel unit based on the voltage signal output from the conversion circuit.

11. The compensation device of claim 9, wherein the input unit is a mirror current source.

12. The compensation device of claim 11, wherein the input unit comprises a first transistor, a second transistor, a third transistor, and a fourth transistor;

a gate electrode of the first transistor is directly connected with the input terminal, a first electrode of the first transistor is directly connected with the input terminal, and a second electrode of the first transistor is directly connected with a second electrode of the second transistor;

a gate electrode of the second transistor is directly connected with the input terminal, a first electrode of the second transistor is directly connected with a second electrode of the third transistor, and the second electrode of the second transistor is directly connected with a ground terminal;

a gate electrode of the third transistor is directly connected with the first electrode of the second transistor, and a first electrode of the third transistor is directly connected with a first electrode of the fourth transistor, and a gate electrode of the fourth transistor is directly connected with the first electrode of the second transistor, and a second electrode of the fourth transistor is directly connected with the conversion unit, and wherein the input terminal is different from the ground terminal.

13. The compensation device of claim 11, wherein the input unit comprises a fifth transistor and a sixth transistor;

a gate electrode of the fifth transistor is directly connected with the input terminal, a first electrode of the fifth transistor is directly connected with the input terminal, and a second electrode of the fifth transistor is directly connected with a second electrode of the sixth transistor; and a gate electrode of the sixth transistor is directly connected with the input terminal, a first electrode of the sixth transistor is directly connected with the conversion unit, and the second electrode of the sixth transistor is directly connected with a ground terminal, and wherein the input terminal is different from the ground terminal.

14. The compensation device of claim 9, wherein the in each of the plurality of divider resistor groups, one of two adjacent divider resistors has a resistance twice as much as a resistance of another one of the two adjacent divider resistors.

15. The compensation device of claim 9, wherein each of the plurality of first logic elements is a NAND gate, and each of the plurality of second logic elements is a AND gate.

16. The conversion circuit of claim 1, wherein the in each of the plurality of divider resistor groups, one of two adjacent divider resistors has a resistance twice as much as a resistance of another one of the two adjacent divider resistors.

17. The conversion circuit of claim 1, wherein each of the plurality of first logic elements is a NAND gate, and each of the plurality of second logic elements is a AND gate.

18. An operation method of a conversion circuit, the conversion circuit comprising a conversion unit connected between an output terminal and a first voltage terminal, and an input unit connected with an input terminal and the conversion unit, respectively; wherein the operation method of the conversion circuit comprises:

inputting a standard current from the input terminal, supplying, by the input unit, the standard current to the conversion unit, and adjusting an equivalent resistance of the conversion unit such that a voltage signal having a preset value corresponding to the standard current is output from the output terminal; and inputting a drive current from the input terminal, supplying, by the input unit, the drive current to the conversion unit, converting, by the conversion unit, the drive current supplied by the input unit into a voltage signal, and outputting, by the conversion unit, the voltage signal from the output terminal, wherein the conversion unit comprises a plurality of divider resistors connected in series, each of the plurality of divider resistors is connected in parallel with a corresponding one of a plurality of switch elements, and the equivalent resistance of the conversion unit is adjusted by controlling the switch elements corresponding to the plurality of divider resistors, such that a preset voltage corresponding to the standard current is output from the output terminal when the standard current is input from the input terminal, wherein the plurality of divider resistors comprises a plurality of divider resistor groups, each of the plurality of divider resistor groups comprises a same number of divider resistors, and wherein in each of the plurality of divider resistor groups, one of two adjacent divider resistors has a resistance different from a resistance of another one of the two adjacent divider resistors, wherein the conversion unit further comprises one first input terminal, one inverter, a plurality of second input terminals, a plurality of logic elements and one resistor, the one resistor being connected in series with the plurality of divider resistors, wherein the one first input terminal is electrically connected with the plurality of logic elements, respectively, and configured to receive a first control signal, output the first control signal to a plurality of first logic elements of the plurality of logic elements, and output an inverted first control signal to a plurality of second logic elements of the plurality of Ionic elements through the inverter, each of the plurality of second logic elements being different from each of the plurality of first logic elements, each of the plurality of second input terminals is connected with a corresponding one of the plurality of first logic elements and a corresponding one of the plurality of second logic elements, and configured to receive a second control signal and output the second control signal to the corresponding one of the plurality of first logic elements and the corresponding one of the plurality of second logic elements respectively, and each of the plurality of logic elements is connected with a corresponding one of the plurality of switch elements, and configured to control, based on the second control signal and one of the first control signal and the inverted first control signal, the corresponding one of the plurality of switch elements to adjust the equivalent resistance of the conversion unit.

* * * * *